United States Patent
O'Meara et al.

(10) Patent No.: US 6,208,110 B1
(45) Date of Patent: Mar. 27, 2001

(54) METHOD FOR DETERMINING ROTOR POSITION

(75) Inventors: Thomas P. O'Meara, Redondo Beach; Nitinkumar Ratilal Patel, Buena Park, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/409,890

(22) Filed: Oct. 1, 1999

(51) Int. Cl.[7] ........................................... H02P 5/28
(52) U.S. Cl. ..................... 318/721; 318/254; 318/606; 364/474.35
(58) Field of Search ............................. 318/254, 721, 318/606; 364/474.35

(56) References Cited

U.S. PATENT DOCUMENTS 4,814,677 * 3/1989 Plunkett ............................. 318/254
5,144,564 * 9/1992 Naidu et al. ........................ 364/494
5,585,709 12/1996 Jansen et al. ...................... 318/807

* cited by examiner

*Primary Examiner*—Robert E. Nappi
*Assistant Examiner*—Rita Leykin
(74) *Attorney, Agent, or Firm*—Anthony Luke Simon

(57) ABSTRACT

The absolute position of a rotor of a permanent magnet motor is determined by detecting an angular position of a direct axis of the rotor; and detecting a polarity of the rotor to determine the absolute position of the rotor. The polarity of the rotor may be determined by applying a square wave voltage to phase windings of a stator of the motor to generate an mmf vector parallel to the direct axis, measuring phase currents of the phase windings, determining a direct axis current responsive to the measured phase currents and the angular position, determining that the rotor is aligned with the mmf vector if the direct axis current is shifted positive, and determining that the rotor is aligned 180 degrees out of phase with the mmf vector if the direct axis current is shifted negative.

4 Claims, 2 Drawing Sheets

METHOD FOR DETERMINING ROTOR POSITION

BACKGROUND

The present invention relates generally to permanent magnet motors, and more particularly, to an improved magnet polarity detection technique for position sensorless permanent magnet motors, such as those that are used in electric vehicle and other applications.

The assignee of the present invention designs and develops electric vehicles and permanent magnet motors that are used to propel such vehicles. By using a technique disclosed in U.S. Pat. No. 5,585,709 issued to Jansen, for example, one can detect the position of a rotor of the permanent magnet motor but not the magnetic polarity. That is, the absolute position of the rotor is either the detected angle or the detected angle plus 180 degrees. This is due to the fact that the change in motor inductance is periodic over 180 electrical degrees, not 360 as would be required for unique detection. The present invention provides a solution to this problem.

It would therefore be desirable to have an improved magnet polarity detection technique for position sensorless permanent magnet motors.

SUMMARY OF THE INVENTION

The present invention comprises a method for use in determining the absolute position of a rotor of a permanent magnet motor. A preferred embodiment of the method comprises the following steps. The angular position of the direct axis of the rotor is detected. The polarity of the rotor is then detected to determine the absolute position of the rotor.

In a preferred example, this invention determines the polarity of the rotor and therefore the absolute position according to the steps of: applying a square wave voltage to the motor stator to generate an mmf vector parallel to the direct axis of the rotor; measuring the phase currents of the motor stator; calculating the direct axis current responsive to the measured phase currents and the angular position; time averaging the direct axis current; determining that the rotor is aligned with the mmf vector if the time average is offset positive; and determining that the rotor is 180 degrees out of phase with the mmf vector if the time average is offset negative.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
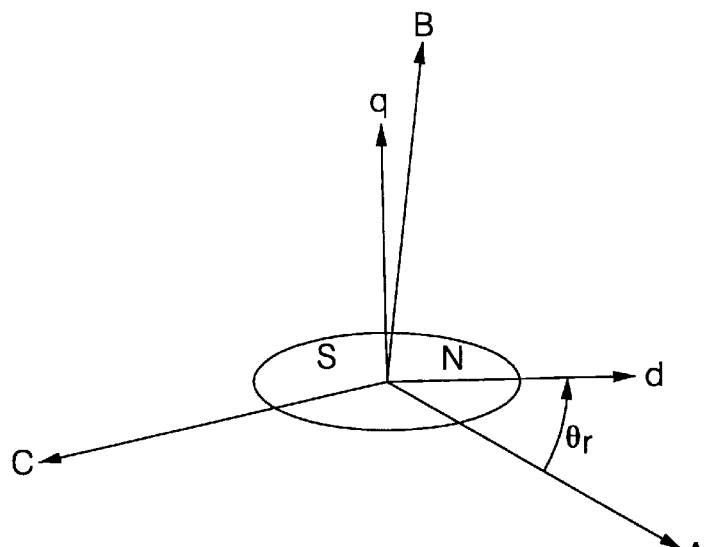
FIG. 1 illustrates an analytical model of a permanent magnet motor that uses stator A phase current as a reference point.

In order to control a permanent magnet motor, such as those used in electric vehicles, knowledge of the absolute position of a rotor of a permanent magnet motor is important. Referring to the drawing figures, FIG. 1 illustrates an analytical model of a permanent magnet motor that uses stator A phase current as a reference point. In FIG. 1, d is the direct axis and q is the quadrature axis (which is orthogonal to the d axis) with respect to coordinate system (A, B, C). The angle $\theta_r$ is the angular position of the rotor.

As was mentioned above, using prior art techniques, it is possible to detect the angular position of the rotor but not the magnetic polarity. That is, the absolute position of the rotor is either the detected angle or the detected angle plus 180 degrees. This is because the motor inductance information is periodic over 180 electrical degrees, not 360 as would be required for unique detection.

Advantageously, knowing the ambiguous position of the rotor, it is possible to determine the speed and the polarity of the rotor and hence its absolute position.

In an example motor, the stator has three phases wound in a Y configuration. By applying a square wave voltage to the motor stator to create an mmf vector parallel to the detected rotor position (parallel to the d-axis in FIG. 1), the effect of magnetic saturation on the current magnitude can be examined.

Figure 2:
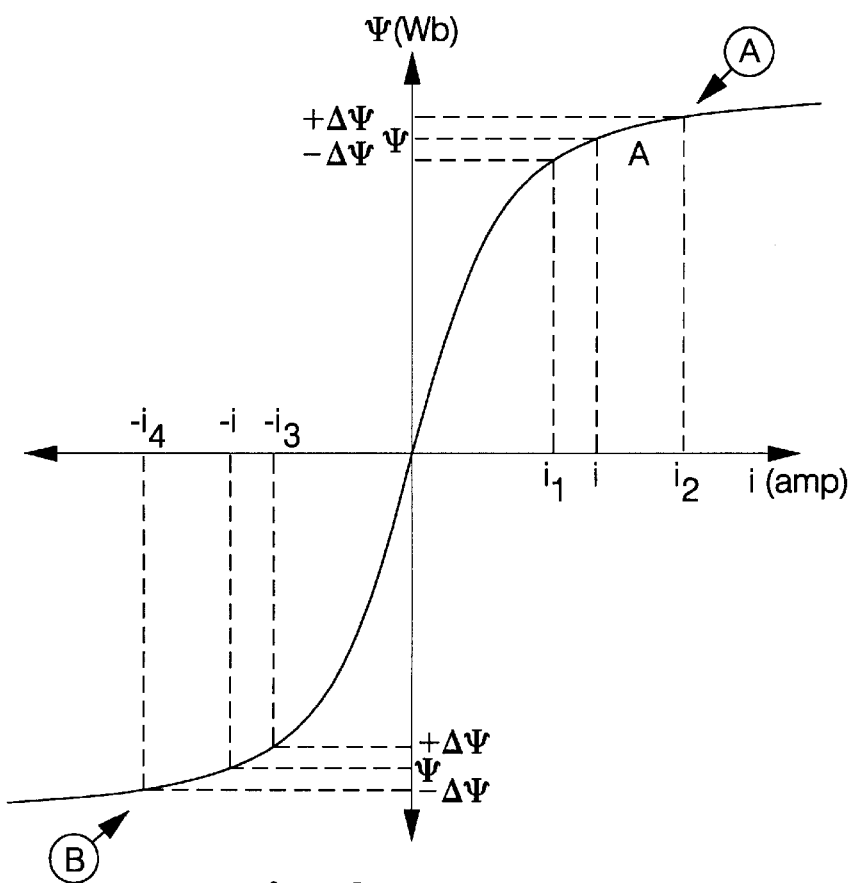
FIG. 2 is a graph that shows the effect of magnetic saturation in permanent magnet motors.

FIG. 2 shows the effect of magnetic saturation in a permanent magnet motor. The figure shows a graph of flux ($\psi$) versus current for the permanent magnet motor and illustrates the magnetic saturation effect in a permanent magnet motor. As is shown in FIG. 2, the magnetic flux, and with it the direct axis current, shift towards point A when the mmf vector created by the applied square wave voltage is in the same direction as the North pole of the rotor. In this case, the magnetomotive force (mmf) of the positive direct axis current is superimposed in an additive direction with the mmf of the rotor magnet which causes a positive current offset. That is, the peaks of the triangular shaped current waveform resulting from the applied square wave voltage are offset positive. The direct axis current at this angle is calculated from the current information in at least two of the phases using a standard rotational transformation that uses the previously detected angle as the angle for transformation. The direct axis current is time averaged and if the time average of the current is greater than zero (shifted positive), then it is determined that rotor is aligned with the mmf vector created by the square wave.

On the other hand, the magnetic flux, and with it the direct axis current, shift towards point B when the mmf vector created by the square wave voltage is in a direction opposite the North pole of the rotor. In this case the mmf of the positive direct axis current is superimposed in a direction opposite the mmf of the rotor magnet, which causes the negative current offset. That is, the peaks of the triangular shaped current waveform resulting from the applied square wave voltage are offset negative. The direct axis current is calculated as described above. The time average of the direct axis current here is less than zero (shifted negative), indicating that the rotor is aligned 180 degrees out of phase with the mmf vector created by the square wave.

Thus the direct (d-axis) current is analyzed based on whether there is a positive or negative current offset to determine at which angle, 0 or 180 degrees, the current offset is pointed. The direct axis current is determined from the phase currents according to the following:

Equation 1:

Ialpha=(measured motor A-phase current)

Equation 2:

Ibeta=((measured motor B-phase current)−(measured motor C-phase current))*1.73205

Equation 3:

Direct axis current Id=Ialpha*cos($\theta_r$)+Ibeta*sin($\theta_r$)

Figure 3:
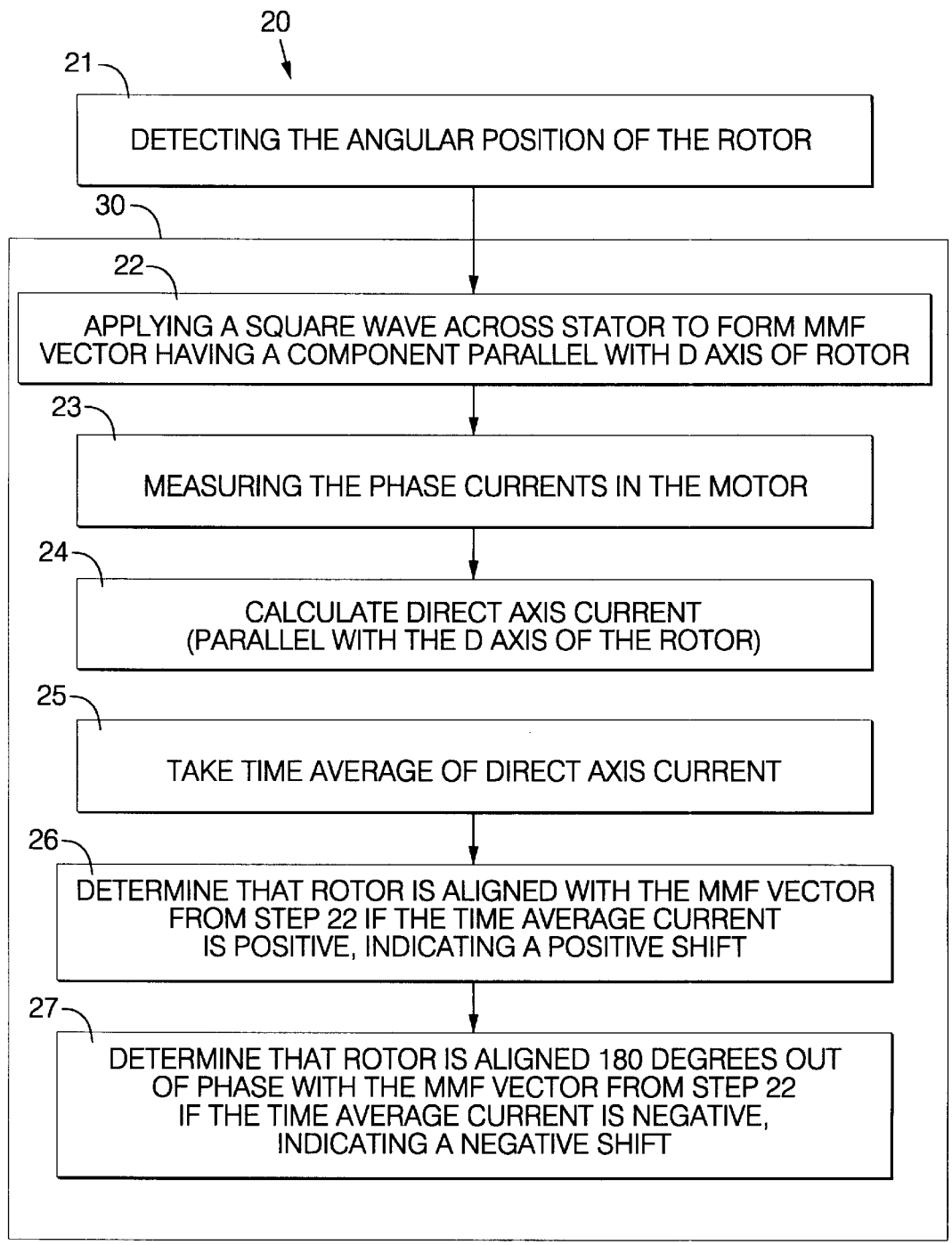
FIG. 3 is a flow chart that illustrates an exemplary absolute rotor position determination method in accordance with the principles of the present invention.

Given the above, FIG. 3 is a flow chart that illustrates an exemplary method or technique 20 in accordance with the principles of the present invention for use in determining the absolute position of a rotor of a permanent magnet motor. The exemplary absolute rotor position detection method 20 comprises the following steps.

First, step 21 detects the angular position of the direct axis of the rotor. This may be achieved using the technique disclosed in U.S. Pat. No. 5,585,709, for example. The polarity of the rotor is then detected 30 to determine the absolute position of the rotor. This may be achieved in the following manner.

A square wave voltage is applied at step 22 to the phase windings of the motor stator to generate an mmf vector parallel to the direct axis of the rotor at the determined angular position. The phase currents in the motor are measured at step 23. At step 24, the direct axis current, that is, the current representing the resulting mmf vector parallel to the direct axis of the rotor, is calculated based upon the measured phase currents and the determined angular position of the direct axis of the rotor. The preferred example uses the equations 1–3 described above. At step 25, the time average of the direct axis current is taken over the period of application of the square wave. Step 26 determines that the rotor is aligned with the mmf vector generated at step 22 if the time average current is positive, indicating a positive shift. And step 27 determines that the rotor is aligned 180 degrees out of phase with the mmf vector generated at step 22 if the time average current is negative, indicating a negative shift.

The present method 20 provides for higher reliability, faster computation, faster drive initialization and start up time. In particular, the present method 20 is much simpler to implement which saves overall computation time of the processor, improves polarity detection, and reduces initial delay in starting motor under position self sensing control. Another advantage of the invention is that it assures minimum torque production during the square wave testing procedure. That is, since the square wave is in parallel with the d axis, minimal or no torque is produced, so the rotor will not tend to rotate in response to the square wave.

Thus, an improved magnet polarity detection method and system for position sensorless permanent magnet motors, such as for permanent magnet motors used in electric vehicles, for example, has been disclosed. The method and system is suitable for implementation in known motor control hardware. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A method for use in determining an absolute position of a rotor of a permanent magnet motor, comprising the steps of:

detecting an angular position of a direct axis of the rotor; and detecting a polarity of the rotor to determine the absolute position of the rotor, wherein the step of detecting the polarity of the rotor comprises the sub-steps of:

applying a square wave voltage to phase windings of a stator of the motor to generate an mmf vector parallel to the direct axis of the rotor;

measuring phase currents of the phase winding;

determining a direct axis current responsive to the measured phase currents and the angular position, wherein the direct axis current is parallel to the direct axis of the rotor;

determining that the rotor is aligned with the mmf vector if the direct axis current is shifted positive; and determining that the rotor is aligned 180 degrees out of phase with the mmf vector if the direct axis current is shifted negative.

2. The method recited in claim 1 wherein the direct axis current is determined according to:

direct axis current Id=Ialpha*cos($\theta_r$)+Ibeta*sin($\theta_r$), where

Ialpha=(measured A-phase motor current),

Ibeta=((measured B-phase motor current)−(measured C-phase motor current))*1.73205; and $\theta_r$=the angular position of the rotor.

3. A method for use in determining an absolute position of a rotor of a permanent magnet motor, comprising the steps of:

detecting an angular position of the rotor; and detecting a polarity of the rotor to determine the absolute position of the rotor by:

applying a voltage to phase windings of a stator of the motor to generate an mmf vector parallel to a direct axis of the rotor;

measuring phase currents of the phase windings;

determining a direct axis current responsive to the measured phase currents and the angular position, wherein the direct axis current is parallel to the direct axis of the rotor;

determining a time average of the direct axis current during application of the voltage;

determining that the rotor is aligned with the mmf vector if the time average is shifted positive; and determining that the rotor is aligned 180 degrees out of phase with the mmf vector if the time average is shifted negative.

4. The method recited in claim 3 wherein the direct axis current is determined by:

direct axis current Id=Ialpha*cos($\theta_r$)+Ibeta*sin($\theta_r$), where

Ialpha=(measured A-phase motor current),

Ibeta=((measured B-phase motor current)−(measured C-phase motor current))*1.73205; and $\theta_r$=the angular position of the rotor.

* * * * *